United States Patent
Gottlieb et al.

(12)
(10) Patent No.: US 6,202,446 B1
(45) Date of Patent: Mar. 20, 2001

(54) VACUUM SYSTEM FOR AN I.S. MACHINE

(75) Inventors: Russell B. Gottlieb, Canton Center; Gary R. Voisine, East Hartford, both of CT (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/261,354

(22) Filed: Mar. 3, 1999

(51) Int. Cl.[7] .................................................... C03B 9/20
(52) U.S. Cl. ................................................. 65/263; 65/229
(58) Field of Search ............................. 65/81, 171, 229, 65/263

(56) References Cited

U.S. PATENT DOCUMENTS 3,175,895 * 3/1965 Zappia .
4,276,073 * 6/1981 Northup .

* cited by examiner

Primary Examiner—Sean Vincent
(74) Attorney, Agent, or Firm—Spencer T. Smith

(57) ABSTRACT

A vacuum system is disclosed for opposed engaged pairs of blow mold halves on a section of an I.S. machine. The system includes a bottom housing which is open at the top and closed by a top plate assembly including a top plate having a vertical opening for each of the opposed pairs of blow mold halves and an annular manifold support portion below the top plate. A vacuum manifold which has a cylindrical inlet conduit and a vertical outlet conduit beneath each of the top plate vertical openings is supported by the annular mold support portion. A vacuum tube slides into the cylindrical inlet conduit and is mounted on the annular manifold portion. The vacuum tube has a hole for communicating with each of the vacuum manifold vertical outlets.

2 Claims, 3 Drawing Sheets

VACUUM SYSTEM FOR AN I.S. MACHINE

The present invention relates to I.S. (individual section) machines which transform gobs of molten glass into bottles in a two step process and more particularly to the vacuum mechanism for that machine.

BACKGROUND OF THE INVENTION

The first I.S. machine was patented in U.S. Pat. No. 1,843,159, dated Feb. 2, 1932, and U.S. Pat. No. 1,911,119, dated May 23, 1933. An I.S. (individual section) machine has a plurality of identical sections (a section frame in which and on which are mounted a number of section mechanisms) each of which has a blank station which has one or more blankmolds for receiving a corresponding number of gobs of molten glass. The received gobs are formed into parisons having a threaded opening at the bottom (the finish) and a blow station which receives the parisons and forms them into bottles standing upright with the finish at the top. The most recent design for an I.S. machine is disclosed in U.S. Pat. No. 5,830,254 and a conventional system for supplying vacuum is shown in U.S. Pat. No. 4,657,573.

The blow molds are made up of two mold halves which are displaceable from a remote position to a mold closed position. When the blow mold halves close, they engage a bottom plate that forms the bottom of the container. When vacuum is used in the process of forming the container, vacuum passages in the bottom plate align with mating holes in the blow mold when it is closed. There are several advantages to using vacuum. For example, in wide mouth containers, where their heavier weight requires more heat removal, the vacuum is used largely to form the container.

For containers using the narrow neck press and blow process, the forming is delayed when the parison is first transferred to the blow mold to allow time for parison reheat. Vacuum and blow air are applied together to form the finished container more quickly. A disadvantage to the vacuum process is the tendency of the vacuum to draw in fine glass particles and dirt so that the vacuum passages need to be cleaned periodically. In the current state of the art, the vacuum passages are cast into a vacuum manifold. This requires that the passages be cleaned in place which is time consuming because the mechanism is not very accessible. Another option is to change out the housing which supports the vacuum manifold but this is time consuming because of its location.

OBJECT OF THE INVENTION

It is accordingly an object of this invention to provide an improved vacuum system.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
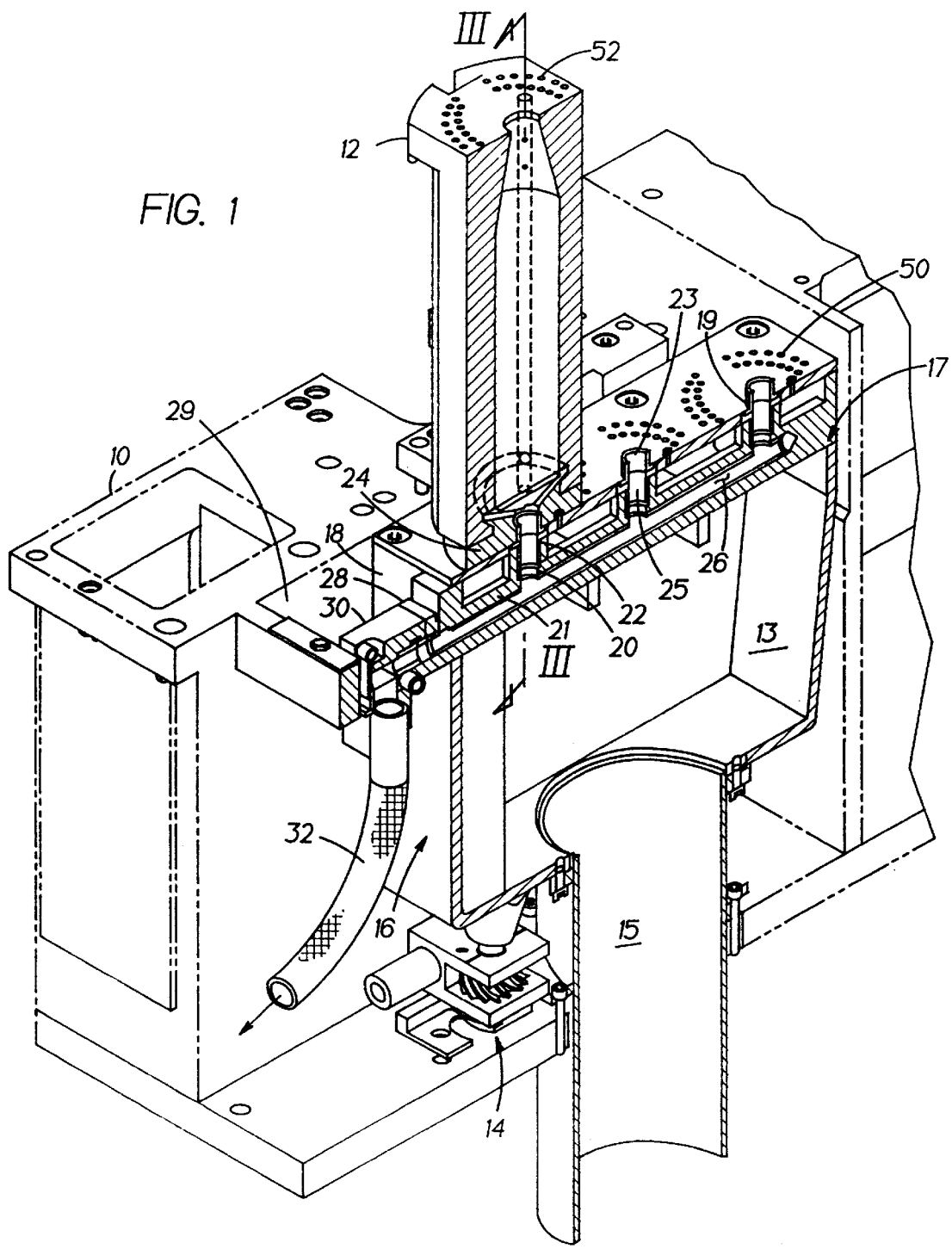
FIG. 1 shows an oblique section through a bottom plate and mold cooling mechanism in accordance with the teachings of the present invention.
Figure 2:
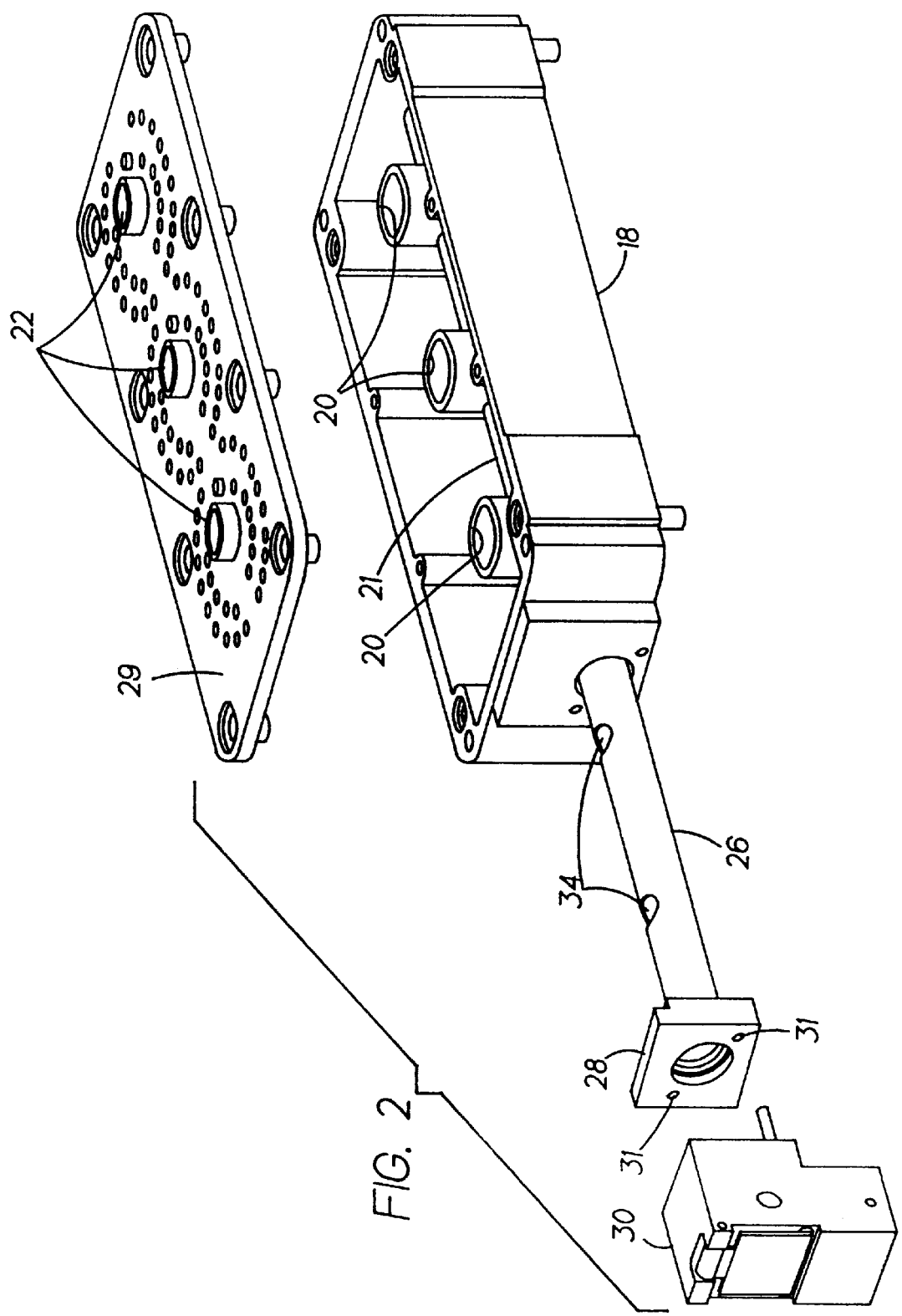
FIG. 2 is an exploded view showing the vacuum manifold with vacuum liner.

A section frame 10 of an I.S. machine has a mold opening and closing mechanism (not shown for clarity purposes) which supports at least one opposed pair of mold halves 12 which displaces the opposed mold halves from a remote position to an advanced position (FIG. 1) where the are in forced engagement. Mounted to the section frame 10 by a raising and lowering mechanism 14 is the bottom housing 13 of a vacuum mechanism 16. The bottom housing is open 17 at the top and an inlet conduit 15 connects to its bottom. The open top 17 is closed by a two piece top. One piece is an annular manifold housing 18 which is secured to the top of the bottom housing. The manifold housing supports an integral vacuum manifold 21 which has at least one vertical outlet conduit 20 which is open at the top. The second piece of the two piece top is a top plate 29 which has a corresponding number of vacuum holes 19. There is a two piece coupling 22 for each top plate hole and each coupling has an upper tubular portion 23 which projects through a top plate hole and a lower tubular portion 25 which is received by the corresponding vertical outlet conduit 20. The upper tubular portion is configured to float on the lower tubular portion and within the top plate hole while it is held in place so that the bottom plate 24 can align with the mold pair 12 when it is in the closed position (the opposed pair of mold halves and the bottom plate define the mold). There is one vertical outlet conduit 20 for each pair of molds 12 (there will be one pair of molds for each gob of molten glass processed in a section). FIGS. 1 and 2 show three vertical outlet conduits, etc., which corresponds to a triple gob machine.

Inserted into the vacuum manifold 21 with a sealingly close fit is a vacuum liner 26 which is in the form of a tube closed at one end. A mounting plate 28 is secured to the open end of the vacuum liner so that it can be sealingly clamped to the manifold housing 18 by a connector 30 that is connected to a vacuum supply pipe 32. The mounting plate 28 has clamping holes 31 that are asymmetrically located about the centerline of the vacuum liner 26 so that it cannot be assembled incorrectly to the manifold housing 18. The vacuum liner 26 also has outlets 34 which communicate with the vertical outlet conduits 20 so that there is one outlet 34 in the vacuum liner 26 for each vertical outlet conduit 20 in the vacuum manifold 21 and the sealingly close fit of the vacuum liner 26 in the vacuum manifold 21 will cause the vacuum flow to be completely through the vacuum liner and will prevent the outlets from communicating with each other.

Figure 3:
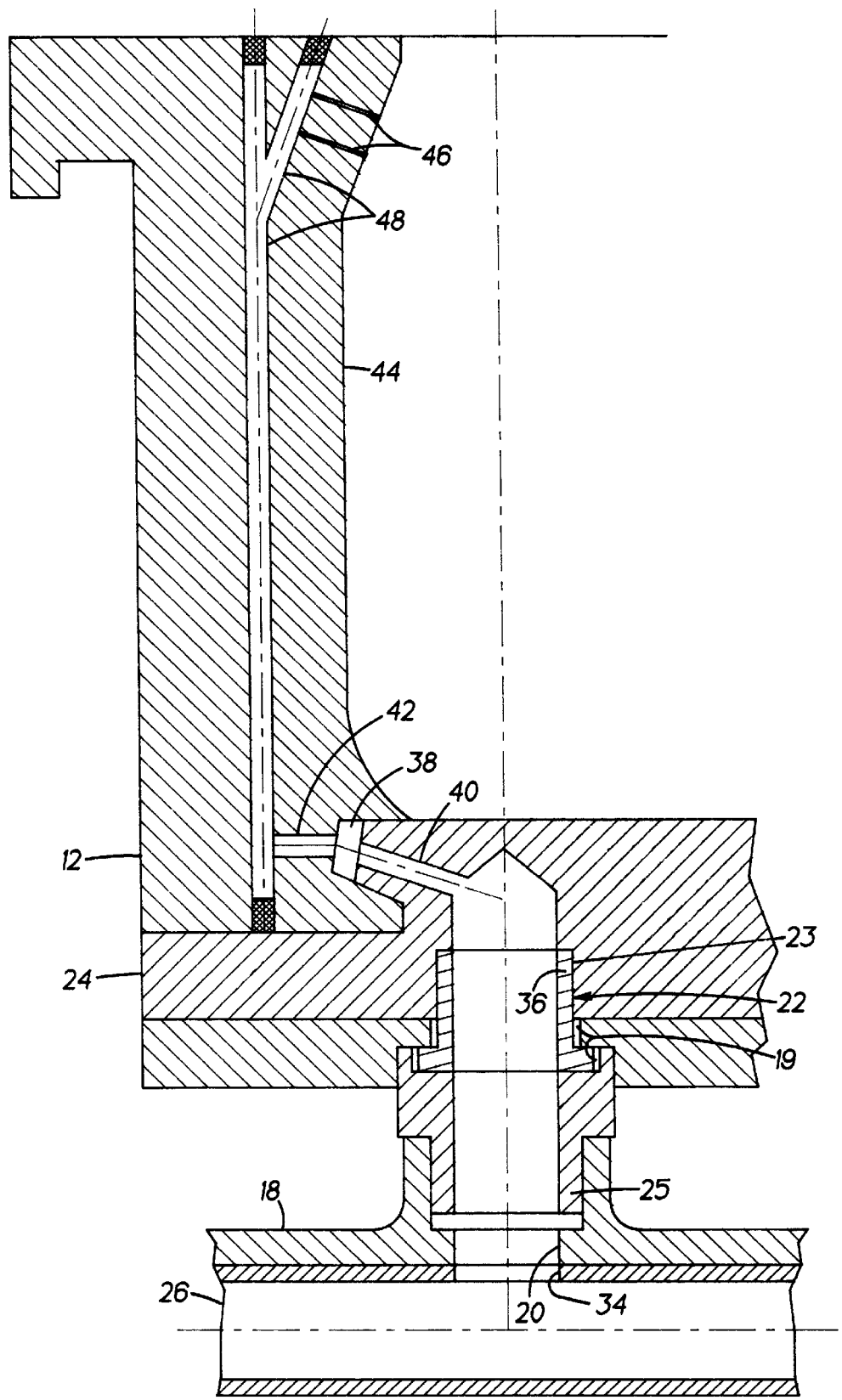
FIG. 3 shows a section through FIG. 1 showing the connection of the vacuum manifold with liner and the blow mold.

The bottom plate 24 (FIG. 3) has a closed end bore 36 to sealingly receive the upper tubular portion 23 of a coupling 22. The fit of the bottom plate 24 in the mold 12 is such that an annular chamber 38 is formed when the mold 12 is closed thus allowing a hole 40 in the bottom plate 24 to communicate with a hole 42 in the mold 12 so that vacuum can flow from the container cavity 44 through the holes 46 in the mold, into the mold vacuum passage 48, into the closed end bore 36, through the coupling 22, through the outlets 34 and 20, into the vacuum liner 26, into the vacuum supply pipe 32 can be effected. The raising and lowering mechanism 14 can be used to position the vacuum mechanism 16 to facilitate changing the vacuum liner 26.

To cool the blow molds, air under pressure flows through the inlet conduit 15, into the bottom housing 13, through cooling holes 50 defined in the top plate 29 and finally upwardly through holes 52 in the blow molds which are in line with the top plate cooling holes 50.

What is claimed is:

1. A vacuum system for opposed engaged pairs of blow mold halves on a section of an I.S. machine comprising a vacuum mechanism including
      a bottom housing open at the top,
      a top plate assembly secured on the open top of said bottom housing including
         a top plate having a vertical opening for each of the opposed pairs of blow mold halves,
         an annular manifold housing below said top plate, and
         a vacuum manifold support by said annular manifold housing having a cylindrical inlet conduit and a vertical outlet conduit communicating with said cylindrical inlet conduit beneath each of said top plate vertical openings, and
   a vacuum tube assembly including
      a vacuum tube having an open end and selectively configured for sliding engagement within said cylindrical inlet conduit,
      said vacuum tube having a length sufficient to extend the vacuum tube past each of the vertical outlet conduits of the vacuum manifold,
      a mounting plate secured to the open end of said vacuum tube, and
      means for securing said mounting plate on said annular manifold housing with said vacuum tube within said vacuum manifold cylindrical inlet conduit,
      said vacuum tube having a hole for communicating with each of said vacuum manifold vertical outlets.

2. A vacuum system for opposed engaged pairs of blow mold halves on a section of an I.S. machine according to claim 1, wherein said vacuum tube seals said vacuum manifold cylindrical inlet conduit.

\* \* \* \* \*